(12) United States Patent
Sinnett

(10) Patent No.: US 9,070,069 B2
(45) Date of Patent: Jun. 30, 2015

(54) SPRING ORIENTED RFID BOARD

(75) Inventor: Jay Clifford Sinnett, Greenville, SC (US)

(73) Assignees: MICHELIN RECHERCHE et TECHNIQUE S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 98 days.

(21) Appl. No.: 13/819,976

(22) PCT Filed: Aug. 30, 2010

(86) PCT No.: PCT/US2010/047128
§ 371 (c)(1),
(2), (4) Date: Feb. 28, 2013

(87) PCT Pub. No.: WO2012/030321
PCT Pub. Date: Mar. 8, 2012

(65) Prior Publication Data
US 2013/0153669 A1    Jun. 20, 2013

(51) Int. Cl.
*G06K 19/06* (2006.01)
*G06K 19/077* (2006.01)
*B60C 23/04* (2006.01)

(52) U.S. Cl.
CPC ...... *G06K 19/07764* (2013.01); *B60C 23/0452* (2013.01); *B60C 23/0493* (2013.01)

(58) Field of Classification Search
CPC ........... H01L 2924/00014; H01L 2224/13099; H01Q 1/2225; H01Q 11/08; H01Q 1/2241; H01Q 7/06; H01Q 7/08; H01Q 1/362; H01Q 1/242; H01Q 1/38; H01Q 21/0087; H01Q 21/061; H01Q 1/22; H01Q 1/243; H01Q 9/02; G06K 19/07764; B60C 23/0452; B60C 23/0493; G01S 19/39; G01S 19/36; G01S 19/45; G01S 3/043; G01S 3/32; G01S 3/48; G01S 19/47; G01S 19/15; G01S 19/20; G01S 1/18; G01S 13/89; G01S 19/14; G01S 19/23; G01S 19/54; G01S 13/58
USPC .................................. 235/492, 488
See application file for complete search history.

(56) References Cited

U.S. PATENT DOCUMENTS 6,836,253 B2   12/2004   Strache et al.
7,102,499 B2   9/2006    Myatt et al.
(Continued)

FOREIGN PATENT DOCUMENTS

JP       2007049351 A    2/2007
WO    WO 2006/098710 A1   9/2006
(Continued)

OTHER PUBLICATIONS

PCT International Search Report for PCT/US2010/047125, dated Oct. 26, 2010.

*Primary Examiner* — Thien T Mai
(74) *Attorney, Agent, or Firm* — Dority & Manning, P.A.

(57) ABSTRACT

Disclosed is an apparatus for providing an RFID device for integration into a tire. A printed circuit board (PCB) is provided with a pair of asymmetric arms forming notches in opposed ends of the PCB. Helically wound antenna elements are positioned in the notches such that the ends of the asymmetric arms are positioned adjacent the nearest approach of the individual helically wound antenna elements.

11 Claims, 1 Drawing Sheet

(56) References Cited

U.S. PATENT DOCUMENTS

| | | |
|---|---|---|
| 7,196,617 B2 | 3/2007 | Sinnett et al. |
| 7,674,117 B2 | 3/2010 | Sinnett et al. |
| 2005/0076982 A1* | 4/2005 | Metcalf et al. ............. 152/152.1 |
| 2007/0274030 A1 | 11/2007 | Robert |
| 2008/0192451 A1 | 8/2008 | Sinnett et al. |
| 2012/0091209 A1* | 4/2012 | Hotaling et al. .............. 235/488 |

FOREIGN PATENT DOCUMENTS

| | | |
|---|---|---|
| WO | WO 2009/134243 A1 | 11/2009 |
| WO | WO 2012/030321 A1 | 3/2012 |

* cited by examiner

FIG. 1
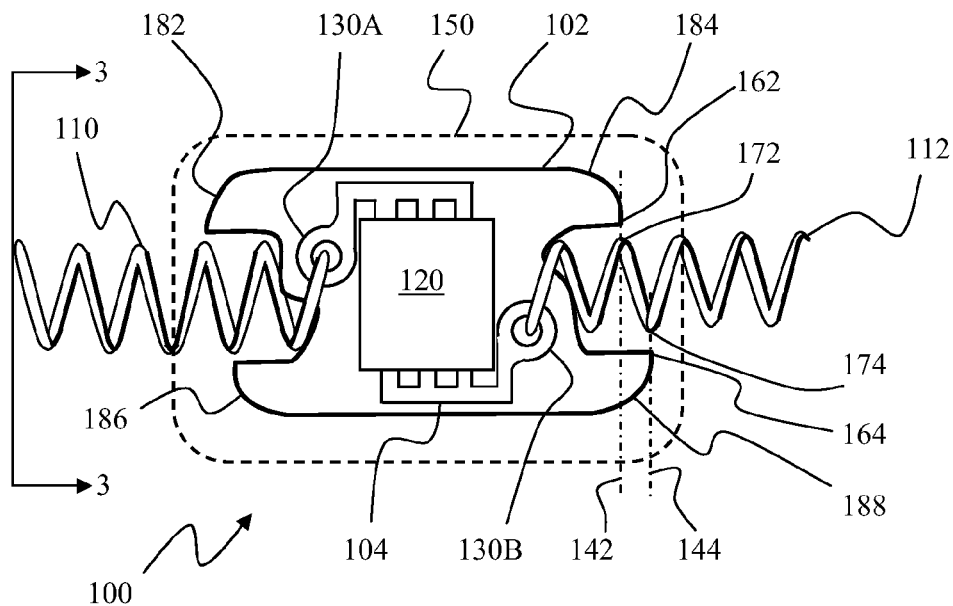
FIG. 2 (Prior Art)
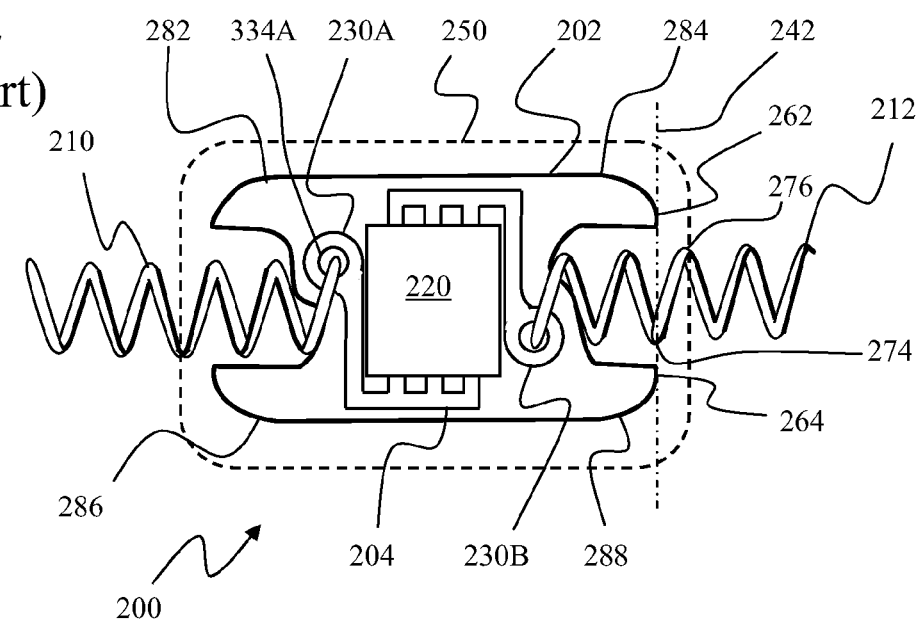
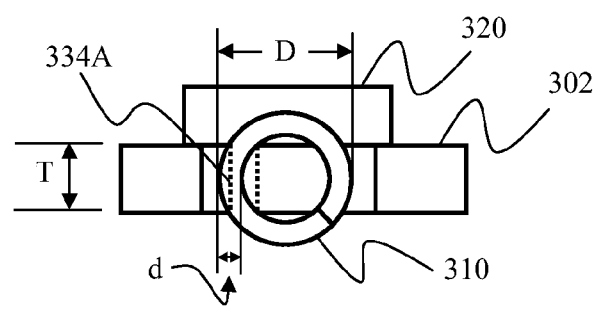
FIG. 3

SPRING ORIENTED RFID BOARD

FIELD OF THE INVENTION

The present subject matter is directed to RFID (Radio Frequency Identification) devices for integration into tires. More particularly, the present subject matter relates to RFID apparatus for providing improved resistance to antenna fatigue failure.

BACKGROUND OF THE INVENTION

Electrical circuits are used in a variety of environments that can present particular physical, chemical, and electrical factors for which the circuit must either be protected or be designed to endure. The present invention primarily concerns physical factors such as mechanical stress leading to fatigue, which in turn can cause a circuit malfunction by physically breaking or weakening a specific part of the circuit, A typical location for such malfunction is at or near the point of connection of a wire, lead, or other conductor to an electrical circuit. In circumstances where the wire and the connected-to circuit may move or rotate relative to one another, the wire may incur a concentration of mechanical stress and/or fatigue at or near the point of connection to the circuit. Mechanical stresses such as repeated bending or twisting, for example, can lead to a weakening of the wire until a break occurs.

Electronics integrated within a tire or other product offer potential advantages such as asset tracking and measurement of physical parameters as, for example, temperature and pressure. For purposes of the present disclosure, the phrases 'integrated within a tire' or 'integration within a tire' denotes any association of an electronics device with a tire including, but not limited to, encased or adhered entirely or partially within or to any portion of the tire, or attached to an inner or outer surface of the tire.

Often many of these systems rely on a wireless data link to communicate with an information system outside of the vehicle. Such information systems may include, as non-limiting examples, on-board computer systems, drive-by interrogators, or hand-held interrogators. In addition, the types of data communicated over such wireless data links are wide and varied and include such as not only the previously mentioned temperature and pressure but also other physical parameters such as tire rotation speed as well as data corresponding to manufacturing data and a host of other information. What ever the type of data transmitted, the wireless data link requires an antenna to be attached to the electronics in the tire. If the electronics and/or antenna are adhered to the tire rubber, flexing of the tire, either due to the tire building process or normal use can cause the antenna to separate from the electronics due to cracking, breaking, or fatigue.

U.S. Pat. No. 7,196,616 (Sinnett et al.) discloses apparatus and methodology for providing a graduated stiffness, strain-resistant electrical connection. A material is configured around the lead and near the point of connection to the circuit so as to create a region of decreasing flexibility or graduated stiffness near the point of connection. Another example of a tire electronics system can be found in U.S. Pat. No. 7,102,499 (Myatt), which concerns an electronic communications device for a tire that includes a radio device and an antenna to be attached to or embedded in a tire.

U.S. Patent Application Publication No. U.S. 2007/0274030 A1 (Robert) also relates to tire electronics, and more particularly discloses an electronic module designed to be incorporated in a tire comprising a functional device, a support and at least one device for electrically connecting a wire and a device for mechanically fixing the wire, separate from the electrical connection device, for mechanically fixing the wire to the support.

The PCT Application published as International Publication Number WO 2006/098710 A1 (Sinnett et al.) is directed to a strain-resistant electrical connection for coupling an antenna or other conductive lead to a circuit.

Other similar subject matter is described in JP2007049351A entitled "Electronic Tag For Tire And Pneumatic Tire" as an electronic tag with a coil-shaped antenna connected to an integrated circuit chip. The coil-shaped antenna includes dual pitch wound portions with the higher pitch winding coupled to the integrated circuit chip. U.S. Pat. No. 6,836,253 B2 (Strache et al.) describes a transmitter or receiver unit for building into elastic structures including tires. The unit may include an antenna taking several forms including a coiled-wire configuration.

The PCT Application published as International Publication Number WO 2009/134243 (Sinnett et al.) is directed to an In-Plane RFID Antenna incorporating a strain-resistant electrical connection for coupling an antenna lead to a circuit. This published application describes a technique similar to that described with reference to the known devices illustrated herein in FIG. 2 and described later in comparison to the present subject matter.

While various implementations of tire electronics devices such as RFID devices in tire electronic systems have been developed, and while various methodologies have been developed to relieve stress at electrical coupling points, no design has emerged that generally encompasses all of the desired characteristics as hereafter presented in accordance with the present technology.

SUMMARY OF THE INVENTION

In view of the recognized features encountered in the prior art and addressed by the present subject matter, improved apparatus and methodology for providing an improved antenna configuration and electrical connection thereof for RFID devices has been provided.

In an exemplary embodiment of the present subject matter, an RFID device is provided for integration into a tire. The device includes a printed circuit board (PCB) having top and bottom surfaces delineated by opposed end portions and opposed side portions and incorporates a plurality of conductive traces on the top surface of said PCB. The PCB includes a pair of asymmetric arms extending from one end thereof forming a notch in the end of the PCB. A plated through via pierces the PCB from the top surface to the bottom surface and has a conductive trace element surrounding the via at the top surface of said PCB, and the conductive trace element is electrically coupled to the plurality of conductive traces. An end portion of a helically wound antenna element is positioned within the notch and within a plane defined by the top surface of the PCB. The helically wound antenna element is wound with a predetermined pitch such that the pair of asymmetric arms differ in length by one half the predetermined pitch, and an end of each of the arms of the pair of asymmetric arms extends so that it ends adjacent to the nearest approach of the helically wound antenna element.

In certain embodiments a non-conductive elastomeric material surrounds the PCB and at least a portion of the antenna element, and fills the notch to synergistically provide, along with the positioning of the antenna within the notch and the plane of the PCB, a controlled stress gradient for the antenna connection to the PCB.

In particular embodiments, the antenna element comprises a helically wound conductor having an outer diameter between about 1.15 and 1.25 mm, while in selected embodiments the antenna element comprises a helically wound conductor having an outer diameter of about 1.2 mm. In certain embodiments, the helically wound conductor is wound with a single pitch between turns ranging between about 0.735 mm to 0.803 mm per turn. In particular embodiments the single pitch between turns is about 0.769 mm per turn.

In yet further embodiments the device further comprising a second notch formed by a second pair of asymmetric arms positioned at the opposing end of said PCB, a second plated through via pierces the PCB and a second antenna is positioned within said second notch and in the plane defined by the top surface of the PCB.

In specific embodiment of the present subject matter, the difference in length of the asymmetric arms may correspond to between about 0.3675 and 0.4015 mm. In more specific embodiments, the difference in length of the asymmetric arms may correspond to about 0.3845 mm.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a top view of an exemplary RFID device in accordance with present technology for integration into a tire;

FIG. 2 illustrates a top view of a previously known RFID device; and,

FIG. 3 illustrates an end view of the RFID device in enlarged scale taken from the viewpoint of arrows 3-3 of FIG. 1.

Repeat use of reference characters throughout the present specification and appended drawings is intended to represent same or analogous features or elements of the invention.

DETAILED DESCRIPTION OF THE PREFERRED EMBODIMENTS

As discussed in the Summary of the invention section, the present subject matter is particularly concerned with apparatus for providing improved resistance to antenna fatigue failure for RFID devices.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to the presently preferred embodiments of the subject RFID device but with reference first to FIG. 2 illustrating a top view of a previously known RFID device 200 for comparison with present technology.

As may be seen from FIG. 2, RFID device 200 includes a printed circuit board (PCB) 202 on which is provided a number of conductive traces 204. An integrated circuit (IC) device 220 is mounted to PCB 202 in conventional manner and is electrically connected to traces 204 and, via portions 230A, 230B of traces 204 to antenna elements 210, 212. It should be appreciated that the illustrated antenna elements 210, 212 are not drawn to scale and are intended to be extended following the illustrated helical form to a length corresponding to at least approximately the resonant frequency of the RFID system.

Trace 204 portions 230A, 230B surround plated through vias as exemplified by plated through via 234A that pass through PCB 202 and connect to a pair of solder pads (Not separately illustrated) on the bottom surface of PCB 202. The end portion of helical antenna element 210 continues in an unbroken pattern through the via-hole 334A and around until it touches the solder pads. When the end portion of helical antenna element 210 touches the solder pad, it may be bonded to the solder pad such as by soldering.

Further still, it will be noticed that in the previously known configuration of FIG. 2, the antenna elements 210, 212 are placed within the plane of PCB 202 and, more specifically, between arm portions 282, 286, and 284, 288. A graduated stiffness of the electrical connection is achieved through the synergistic cooperation of the arms, antenna element and a non-conductive elastomeric material 250 between the arms and enveloping the antenna element. In the known arrangement, as well as the present embodiment, all portions of the assembled device may be coated with a bonding agent such as Chemlok® available from LORD Corporation, prior to embedding the assembled device in the non-conductive elastomeric material. Placing the antenna within the plane of the PCB 202 allows an opportunity to increase the thickness T (FIG. 3) of PCB 202 to thereby provide a stronger assembled device.

With further attention to FIG. 2, it will be seen that PCB 202 is provided with notched portions between arms 282, 286 and 284, 288. The notch portions are configured to provide curved shaped portions that define the location of the helical spring wire antenna elements 210, 212. It will be observed that arm portions 282, 286, and 284, 288, correspond in pairs to equal length arms as illustrated by vertical line 242 intersecting both arm ends 262 and 264 at the extreme end of arms 284, 288, respectively, on the right end of FIG. 2. This gives rise to the possibility of positioning antenna 212 such that point 274 may lie in close juxtaposition to end point 264 of arm 288 but, because the arms 284 and 288 are of equal lengths, a generally corresponding point 276 on antenna 212 close to end point 262 of arm 284 is positioned a distance from end point 262 due to the pitch of the helical antenna winding.

With reference now to FIG. 1, there is illustrated a top view of an exemplary RFID device 100 in accordance with present technology for integration into a tire. Those of ordinary skill in the art will appreciate that while the device described herein has particular use in relation to tire technology, such is not a limitation of the device itself as such device may be employed with other technologies as well where damage may occur to the device or to the electrical connections as a function of induced stress. A shipping pallet or container for moving goods that may be identified by way of the RFID device 100 is one such example.

RFID device 100 in accordance with present technology includes all of the features previously described with respect to known device 200 as illustrated by corresponding 100-series labels, In general, device 100 provides an integrated circuit device 120 mounted on a printed circuit board (PC) 102. PC board 102 includes conductive traces 104 and portions 130A, 130B surrounding plated through via through which antenna elements 110, 112 may be extended and soldered all in similar manner to that illustrated in FIG. 2 corresponding to the known device 200.

In contrast, RFID device 100 in accordance with present technology provides arms 182, 186 and 184, 188 that are asymmetric such that the arms of each of the two pairs of arms differ in length. This difference is illustrated by the difference in spacing between vertical lines 142, 144 that touch respectively, the end portions 162, 164 of arms 184, 188. A similar difference in arm length with respect to arms 182, 186 is illustrated but not separately labeled to reduce clutter on the figure.

Further with respect to the embodiment illustrated in FIG. 1, it will be noticed that the coil pitch of antenna elements 110, 112 is configured so that the ends 162, 164 of arms 184, 188 extend so that they end directly adjacent to the nearest approach 172, 174 of the helical spring forming antenna element 112. In this way the antenna wire fatigue failure that arms 282, 284, 286, 288 combined with potting material 250 was designed to address from the known device 200 of FIG. 2 is extended to a new and significantly improved level by making the reinforcement provided by the arms be precisely located with respect to individual turns of the helical spring forming antenna elements 110, 112.

In this way the synergistic cooperation of arms 182, 184, 186, 188, antenna elements 110, 112 and non-conductive elastomeric material 150 enveloping the arms and the antenna element as noted above with respect to the Prior Art of FIG. 2 is improved. In the present embodiment as in the known arrangement previously mentioned above, all portions of the assembled device may be coated with a bonding agent such as Chemlok® prior to embedding the arms and antenna elements in elastomeric material 150. By positioning the ends of arms 182, 184, 186, 188 so that they end directly adjacent to the nearest approach of the helical spring forming antenna element and enveloping the assembly in elastomeric material that is bonded to the components, a significantly improved fatigue resistance for the antenna element may be achieved.

In an exemplary configuration, helical coil antenna elements 110, 112 may correspond to a helical coil having an outside diameter D (FIG. 3) of between about 1.15 to 1.25 mm. More specifically, the outer diameter D may be 1.2 mm +/−0.025 mm. The wire forming the helical coil antenna elements 110, 112 may have a diameter d (FIG. 3) of between about 0.152 to 0.254 mm. More specifically, the wire diameter d may be 0.203 mm +/−0.0508 mm. The helix pitch of the helical spring forming antenna elements 110, 112 may range from 7.35 mm to 8.03 mm over 10 turns. More specifically, over 10 turns, the helix pitch may be 7.69 mm +/−0.17 mm. With these measurements, in an exemplary configuration, arms 182, 186 and 184, 188 may differ in length by about 0.3675 mm to 0.4015 mm. More specifically, arms 182, 186 and 184, 188 may differ in length by 0.3845 mm +/−0.0085 mm.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An RFD device for integration into a tire, comprising:
   a printed circuit board (PCB) having top and bottom surfaces delineated by opposed end portions and opposed side portions;
   a plurality of conductive traces on the top surface of said PCB;
   a pair of asymmetric arms extending from one end of said PCB forming a notch;
   a plated through via piercing the PCB from the top surface to the bottom surface;
   a conductive trace element surrounding said via at the top surface of said PCB, the trace element electrically coupled to the plurality of conductive traces; and,
   a helically wound antenna element having an end portion positioned within said notch and within a plane defined by the top surface of the PCB,
   wherein said helically wound antenna element is wound with a predetermined pitch, wherein said pair of asymmetric arms differ in length by one half the predetermined pitch, and wherein both of said pair of asymmetric arms extends so that each of said pair of asymmetric arms ends aligned with the nearest approach of said helically wound antenna element.

2. The device of claim 1, further comprising a non-conductive elastomeric material surrounding said PCB and at least a portion of said antenna element, and filling said notch,
   whereby synergism among the elastomeric material and the positioning of the antenna within the notch and the plane of the PCB provides a controlled stress gradient for the antenna connection to the PCB.

3. The device of claim 1, wherein the antenna element comprises a helically wound conductor having an outer diameter between about 1.15 and 1.25 mm.

4. The device of claim 3, wherein the antenna element comprises a helically wound conductor having an outer diameter of about 1.2 mm.

5. The device of claim 3, wherein the helically wound conductor is wound with a single pitch between turns, the pitch ranging between about 0.735 mm to 0.803 mm per turn.

6. The device of claim 5, wherein the helically wound conductor is wound with a single pitch between turns of about 0.769 mm per turn.

7. The device of claim 1, wherein the length of the asymmetric arms differs by about 0.3675 mm to 0.4015 mm.

8. The device of claim 1, wherein the length of the asymmetric arms differs by about 0.3845 mm.

9. The device of claim 1, further comprising a second notch formed by a second pair of asymmetric arms positioned at the opposing end of said PCB, a second plated through via pierces the PCB and a second antenna positioned within said second notch and in the plane defined by the top surface of the PCB.

10. The device of claim 1, further comprising a non-conductive elastomeric material surrounding said PCB and at least a portion of said antenna element, and filling said notch,
   whereby synergism among the elastomeric material and the positioning of the antenna within the notch and the plane of the PCB provides a controlled stress gradient for the antenna connection to the PCB, 11. The device of claim 10, further comprising a bonding agent for securing said non-conductive elastomeric material to the antenna element and PCB.

\* \* \* \* \*